Feb. 8, 1949.    M. H. CARL    2,461,141
APPARATUS FOR THE TOP SEPARATION OF NITROTOLUENE
Original Filed Jan. 27, 1943    2 Sheets-Sheet 1
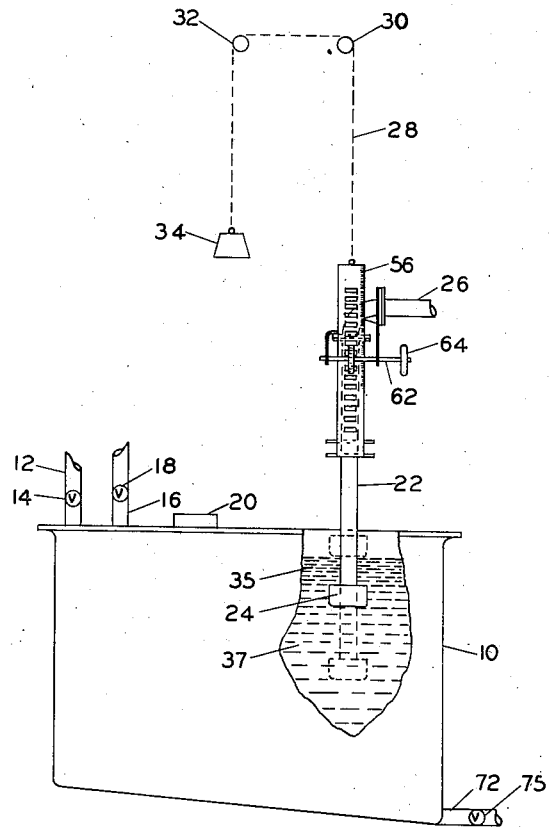
Figure I
Marvin H. Carl
INVENTOR
BY
ATTORNEY Feb. 8, 1949.  M. H. CARL  2,461,141
APPARATUS FOR THE TOP SEPARATION OF NITROTOLUENE
Original Filed Jan. 27, 1943  2 Sheets-Sheet 2
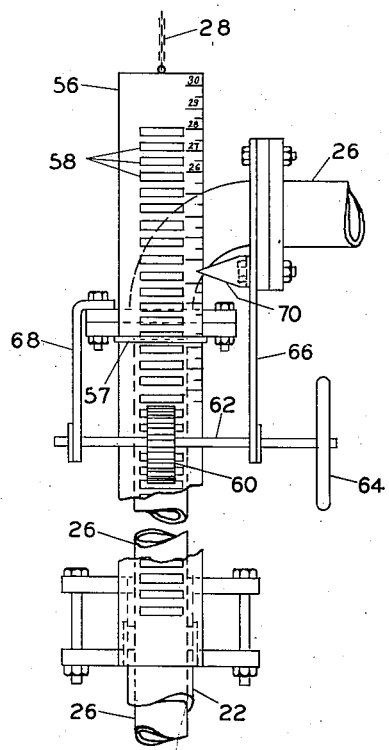
Figure II
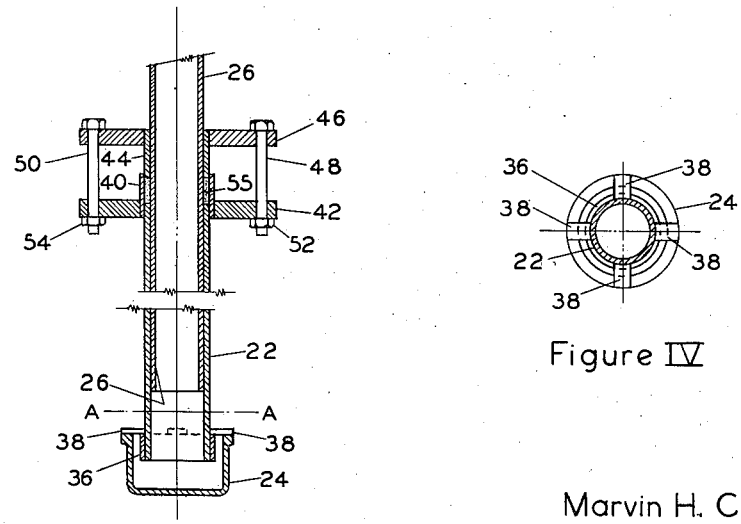
Figure III
Figure IV
Marvin H. Carl
INVENTOR
BY
ATTORNEY Patented Feb. 8, 1949

2,461,141

UNITED STATES PATENT OFFICE 2,461,141

APPARATUS FOR THE TOP SEPARATION OF NITROTOLUENE

Marvin H. Carl, St. Louis, Mo., assignor to Atlas Powder Company, Wilmington, Del., a corporation of Delaware Original application January 27, 1943, Serial No. 473,712. Divided and this application February 9, 1945, Serial No. 577,119

1 Claim. (Cl. 23—285)

This application relates to the preparation of nitrotoluene.

An object of the invention is the provision of an improved apparatus for the separation of nitrotoluene from nitrating liquors.

Nitrotoluenes are usually prepared by treating toluene with a nitrating mixture made up of concentrated nitric and sulfuric acids. When trinitrotoluene is to be prepared the reaction is often performed in a plurality of stages, usually three, a first stage in which toluene is nitrated to mononitrotoluene, a second stage in which mononitrotoluene is nitrated to dinitrotoluene, and a third stage in which dinitrotoluene is nitrated to trinitrotoluene. In each of these nitrations the toluene, or lower nitrotoluene, and nitrating acids are usually mixed together in a reaction kettle suitably provided with means for maintaining the reaction mixture at desired temperatures. After the reaction has ceased, the reaction mixture is allowed to settle whereupon the nitrotoluene produced separates from the spent nitrating mixture and floats on top of it.

According to the present invention nitrotoluene is separated from the spent acids in a nitrating process by means of a top separation.

The invention may be more fully understood by reference to the accompanying drawings which show one embodiment of apparatus suitable for performing the invention and in which:

Figure 1 is a diagrammatic view of a nitrating kettle with a separating device of the present invention attached;

Figure 2 is a detailed view of a portion of the separating means shown in Figure 1;

Figure 3 is a detailed view of the lower portion of the separating means shown in Figure 1; and Figure 4 is a sectional view taken along line A—A on Figure 3.

As shown in the drawings a nitrating kettle 10 is equipped with inlet pipe 12 containing valve 14 and inlet pipe 16 containing valve 18. Inlet pipe 12 may be used for the introduction of the nitrating mixture, and inlet pipe 16 may be used for the introduction of toluene or lower nitrotoluene. Kettle 10 is further equipped with removable plate 20 for access to it. Through the top of nitration kettle 10 extends pipe 22 which carries cup 24 around its base. Pipe 22 is so constructed that its end portion containing cup 24 may be placed at various heights in kettle 10. This is accomplished by permitting it to slide up and down over and outside of fixed pipe 26. Pipe 22 is supported by means of a chain 28 which runs over pulleys 30 and 32 to a counterweight 34. In operation toluene and a nitrating mixture are charged into kettle 10 and mixed until the nitration has been performed. The mixture of spent nitrating mixture and nitrotoluene produced is allowed to settle until the lighter nitrotoluene floats on top of the heavier spent acid mixture. The two layers are shown at 35 and 37. Then pipe 22 is let down into kettle 10 and cup 24 is immersed. Suction is then applied to line 28 and the nitrotoluene is drawn off. The depth to which cup 24 should be sunk may be determined by removing plate 20 at the top of the tank, thieving a sample from the kettle, and determining the depth of the nitrotoluene layer. By thieving a sample from the tank is meant inserting an open tube, preferably made of glass, straight down into the tank, stopping the top end of the tube, and withdrawing it. The depth of nitrotoluene in the tube is then the same as the depth of nitrotoluene in the kettle, and the proper depth to which the cup 24 may be dropped to draw off only nitrotoluene is in that way determined.

The sliding of pipe 22 over pipe 26 and the manner in which cup 24 is affixed to pipe 22 appear best in Figure 3. Pipe 22 is threaded on the outside of its lower end. Threaded sleeve 36 is screwed onto the threaded end of pipe 22. Affixed to sleeve 36 are plates 38, see Figure 4, which support cup 24. Pipe 22 has affixed at its upper end sleeve 40 and sleeve 40 is in turn fixed to flange 42. Inside of sleeve 40 slips pipe 44 which is made of the same size as pipe 22. Sleeve 44 is fixed to flange 46. Flanges 46 and 42 are bolted together by means of bolts 48 and 50 and nuts 52 and 54. Suitable packing material 55 may be inserted inside of sleeve 40. Inside of pipe 22 is pipe 26 which fits snugly therein and extends down no farther than the greatest height to which it is desired to bring cup 24. Sleeve 40, pipe 44 and flanges 46 and 42 comprise a stuffing box for preventing leakage between pipes 22 and 26. It may be seen that pipe 22 and the stuffing box assembly may be slid up and down outside of pipe 26. An arrangement, shown in detail, in Figure 2 is provided for adjusting the depth of cup 24 and pipe 22. Affixed to pipe 22 so that it extends above flange 46 is straight plate 56. Guide 57 is fastened to fixed pipe 26 and guide plate 56. Plate 56 is slotted horizontally at intervals along its length to provide a ratchet as represented at 58. Affixed in operative relation with slotted plate 56 is toothed pinion 60. Pinion 60 is keyed to shaft 62, and shaft 62 and pinion 60 may be turned by means of handwheel 64. Shaft 62 may be supported in any convenient manner so that pinion 60 will be in operative relation with ratcheted plate 56. As shown in the drawings shaft 62 is supported by brackets 66 and 68 which are attached to flanges of an elbow on pipe 26. Also affixed to a flange on rigid pipe 26 is a pointer 70. Plate 56 bears graduations placed thereon so that the depth of cup 24 in kettle 10 may be read directly by means of pointer 70. Plate 56 is conveniently counterweighted by means of chain 28 and counterweight 34, Figure 1. When it is desired to raise or lower pipe 26 in kettle 10 it is only necessary to turn handwheel 64 which through shaft 62 turns pinion 60 which drives ratcheted plate 56 so as to pull pipe 26 up or let it down in accordance with the direction in which handwheel 64 is turned.

It will be noticed that by the means shown, very close control is had as to the depth which cup 24 is immersed into kettle 10. Cup 24 may, therefore, be lowered until its top surface is barely above the interface between nitrotoluene and spent acid. The construction of cup 24 around pipe 26 may be seen to be such that when suction is applied to pipe 26, liquid is drawn in a downward direction into cup 24 and then up pipe 26. In this way there is practically no tendency for waste acid to be drawn into pipe 26 when cup 24 is near the interface, and a relatively complete separation of nitrotoluene and spent acid may be obtained.

In operation, during the main reaction, pipe 22 carrying cup 24 will usually be lifted high in tank 24 so as to be out of the reaction mixture. After the reaction is completed, it will often be found that nitrotoluene and waste acid separate somewhat slowly. A top layer of nitrotoluene and a bottom layer of waste acid may be separated by a considerable space in which an emulsion of nitrotoluene and waste acid is present. This emulsion breaks as time passes, and the middle layer disappears. It is often convenient in the performance of the present invention to lower the pipe 22 slowly while suction is being applied through pipe 26 into the nitrotoluene layer in kettle 10 before separation is completed. In this manner the first formed nitrotoluene may be withdrawn almost as rapidly as it separates from the waste acid, and as more nitrotoluene forms pipe 22 may be lowered until most of the nitrotoluene has been removed even before a complete separation has been obtained. After the removal of the nitrotoluene the spent acid may be fortified in kettle 10 with further acid for use in another nitration process in the same or another kettle. If it is desired to remove spent acid or the fortified acid from the kettle, this may usually be most conveniently accomplished by letting it out through exit pipe 72 and valve 74.

This application is a division of my copending application Serial Number 473,712 filed January 27, 1943 now Patent No. 2,383,707, issued August 28, 1945.

What is claimed is:

Apparatus for the separation of nitrotoluene from spent nitrating mixtures which comprises a nitrating kettle, a movable pipe extending down into said kettle, said movable pipe adapted to slide in telescoping relation over a fixed pipe, a ratchet connected to said movable pipe and outside said tank, a rotatable pinion in operative relation with said ratchet to raise and lower said movable pipe in said tank, counterbalancing means supporting said movable pipe independently of said fixed pipe, a cup enclosing and attached to the lower end of said movable pipe the lip of said cup lying in one horizontal plane, and the sides of said cup being spaced from said movable pipe, whereby liquid flowing into said movable pipe must reverse its direction, and gauge means to indicate the height of said cup in said tank.

MARVIN H. CARL.

REFERENCES CITED

The following references are of record in the file of this patent:

UNITED STATES PATENTS

| Number | Name | Date |
|---|---|---|
| 33,736 | Elliot | Nov. 19, 1861 |
| 466,336 | Franklin | Jan. 5, 1892 |
| 872,232 | Harbert | Nov. 26, 1907 |
| 929,250 | Reynolds | July 27, 1909 |
| 1,183,635 | Dougans | May 16, 1916 |
| 1,494,737 | Cournyer | May 20, 1924 |
| 1,584,550 | Kellogg | May 11, 1926 |
| 2,015,850 | Harrod | Oct. 1, 1935 |
| 2,254,352 | Cloud | Sept. 2, 1941 |

FOREIGN PATENTS

| Number | Country | Date |
|---|---|---|
| 59,604 | Norway | July 11, 1938 |